United States Patent [19]

Nunn

[11] Patent Number: 4,925,313
[45] Date of Patent: May 15, 1990

[54] MIXING SCREW FOR EXTRUSION AND INJECTION MOLDING

[75] Inventor: Robert E. Nunn, Londonberry, N.H.

[73] Assignee: HPM Corporation, Mount Gilead, Ohio

[21] Appl. No.: 178,188

[22] Filed: Apr. 6, 1988

[51] Int. Cl.$^5$ .............................. B01F 7/08; B29B 7/42
[52] U.S. Cl. .......................................... 366/81; 366/90; 366/319; 366/324
[58] Field of Search ...................... 366/79, 80, 81, 88, 366/89, 90, 318, 319, 321, 323, 324, 82, 99, 83, 84; 425/207, 208, 209

[56] References Cited

U.S. PATENT DOCUMENTS

| | | |
|---|---|---|
| 3,184,790 | 5/1965 | Araki ......................... 366/81 |
| 3,652,064 | 3/1972 | Lehnen et al. . |
| 3,687,423 | 8/1972 | Koch et al. ................ 366/81 |
| 3,858,856 | 1/1975 | Hsu . |
| 3,870,284 | 3/1975 | Kruder . |
| 3,941,535 | 3/1976 | Street ........................ 366/90 X |
| 4,000,884 | 1/1977 | Chung . |
| 4,079,463 | 3/1978 | Miller ........................ 366/89 |
| 4,107,788 | 8/1978 | Anders ...................... 366/81 |
| 4,128,341 | 12/1978 | Hsu ........................... 366/89 |
| 4,140,400 | 2/1979 | Lovegrove ................. 366/81 |
| 4,173,417 | 11/1979 | Kruder ...................... 366/89 |
| 4,215,978 | 8/1980 | Takayama et al. ......... 366/79 X |
| 4,405,239 | 9/1983 | Chung et al. .............. 366/89 |
| 4,639,143 | 1/1987 | Frankland, Jr. ........... 366/90 X |
| 4,708,623 | 11/1987 | Aoki et al. ................ 366/319 X |

Primary Examiner—Harvey C. Hornsby
Assistant Examiner—Scott J. Haughland
Attorney, Agent, or Firm—Jeffers, Hoffman & Niewyk

[57] ABSTRACT

A plasticating screw having a mixing section comprised of two flow channels separated by barrier flights having axially spaced undercut sections and areas of compression and decompression in each channel. Inhomogeneities in the material being plasticated are distributed in both the forward and back directions by means of pressure driven cross-flows caused when the material encounters a section of a channel having a decreasing depth adjacent an undercut section of the barrier flight.

16 Claims, 2 Drawing Sheets

MIXING SCREW FOR EXTRUSION AND INJECTION MOLDING

BACKGROUND OF THE INVENTION

The present invention relates to plasticating screws for use in extruders and injection molding machines and in particular to a mixing section on a plasticating screw that is capable of bidirectional distribution of inhomogeneities.

The extrusion and injection molding process, in common with most polymer processing operations, forms shapes from thermoplastic feedstock by softening or plasticating the material to a molten state, shaping the product in an extrusion die or in a closed mold, and solidifying the product by cooling. The properties of the molded product depend to a major extent upon the processing history of the material, and particularly upon the thermal and physical homogeneity of the molten feedstock prior to the forming step. Inhomogeneities in the feedstock can result in the loss of dimensional accuracy, lower physical properties, inconsistent product morphology and reduced product performance and service. Accordingly, processing of a homogeneous melt is a major concern in the injection molding and extrusion industry.

Conversion of the usually solid feedstock to the molten state is accomplished in the extrusion apparatus by the transfer of energy to the polymer from two sources, namely, from the heated barrel by the process of thermal conduction, and from the screw drive motor through the mechanism of viscous dissipation as the polymer is sheared during screw rotation. During shearing of the polymer, material is spatially mixed within the confines of the screw channel, and the extent of this mixing has a significant affect upon the final uniformity of the polymer melt. In the case of injection molding, since this is a cyclic process, the polymer plasticating process is strongly influenced by transient effects which result in differing proportions of the melting energy being supplied by conduction or dissipation mechanisms as the screw rotation operation progresses. This in turn produces a variation in the degree of mixing produced by the screw during rotation. In general, material delivered by the screw during the initial stages of rotation is well mixed whereas material delivered in the final stages of screw rotation is less well mixed. As a result, the uniformity of the melt tends to decrease during plastication. The problems of poorer mixing and the presence of inhomogeneities in the final product is also a problem in extrusion applications.

A number of solutions to the problem of poor mixing in extrusion and injection molding applications have been proposed. One solution is to increase the barrel length-to-diameter ratio of the extruder, which increases the residence time of the material within the extruder screw, thereby achieving better mixing and temperature uniformity. However, this solution is quite costly, and is therefore unacceptable in many situations. Another prior art solution to the problem of incomplete mixing is to provide a plurality of pegs or other protrusions in the screw channel near the discharge end to thereby promote mixing of the solid and molten plastic components.

Other prior art screw designs for extrusion and injection molding employ a plurality of helical channels that are separated by an undercut barrier flight, and the molten plastic is caused to flow back and forth over the barrier flight as the channel depth in the two channels cyclically increases and decreases in an out of phase relationship with each other. An example of an extrusion screw employing this design is disclosed in U.S. Pat. No. 4,273,417 issued to HPM Corporation of Mount Gilead, Ohio.

U.S. Pat. No. 4,405,239 discloses an extrusion screw having a pair of channels separated by flights, the latter being undercut at different locations along the length of the screw. This screw promotes mixing by providing mass transfer of the material in the back-direction, that is, in a direction toward the feed end of the screw. However, a mixing operation that only provides mass transfer in one direction can only provide a final distribution width one-half that of a mixing operation which provides mass transfer in both forward and reverse directions. Furthermore, a plasticating screw with back mixing only will cause the material in the screw channel to experience a higher average residence time, which can lead to additional undesirable degradation, crosslinking and the like.

SUMMARY OF THE INVENTION

The mixing screw according to the present invention provides mass transfer of the plasticated material in both the forward and back directions simultaneously. This has a very significant positive impact on achieving a high degree of homogeneity in the melt at the exit end of the mixing section of the plasticating screw, in both extrusion and injection molding applications. In the case of injection molding, the long range mixing capability required during shot plastication is the action of distributing any local inhomogeneities throughout the shot and spreading them out so that they become mixed with other elements, thereby diluting their influence. For example, if a local inhomogeneity is present in the middle of the injection shot, upon the entry of this inhomogeneity into the mixing section of the screw, the inhomogeneity is subjected to a series of subdivisions and mass transfer operations, with mass transfer occurring in both the spatially forward sense, i.e., directed toward the discharge end of the mixing region, and in the spatially backward sense, i.e., directed toward the feed entry of the mixing section, elements of the inhomogeneity are distributed throughout the shot.

In order to develop such a mixing behavior, the mixing screw of the present invention employs the use of multiple parallel screw channels having regions of compression and decompression involving shallow and deep channel sections, respectively, and the presence of undercuts on the screw flight tips to allow mass flows in both the forward and backward senses between the parallel channels. In effect, the mixing section consists of a series of repeating unit geometries, each of which provides compression, decompression and forward and back flow mass transfers.

The mixing action of the screw results from the positioning of the regions of compression and decompression in the two channels, in the case of a twin channel screw, relative to the flight undercuts. Areas of compression in one channel are in phase with areas of decompression in the other channel and are separated by the undercut flight regions. As a result, pressure differences resulting from flow between material elements in each channel give rise to mass transfers of material between each channel. These cross flows give rise to either forward or back mixing, depending on their direction.

As a given fluid element, such as a local inhomogeneity consisting of a portion of solid material or a portion of molten material of a different color or composition, for example, enters a region of compression, a portion is transferred to the other channel by the cross flow, either in the forward or backward direction, depending on the local geometry. At subsequent compression regions, other portions are similarly transferred from channel to channel. The extent of the resulting mixing depends on the number of cross flow paths present in the overall mixing section geometry. The quantity of material transferred depends on the cross flow rate, which is a function of geometry, flow rate and polymer viscosity, and can be prescribed by the screw designer. The mixing screw of the present invention is applicable to extruders, injection molding machines and blow molding operations.

In a preferred embodiment of the invention, the screw comprises a root and has at least a pair of helical first and second flights extending radially from the root, the flights dividing the screw into two helical flow channels having axially spaced compression areas of decreasing channel depth and decompression areas of either increasing or constant channel depth. The flights each include a plurality of undercut segments separated by segments of greater height. The screw includes a plurality of axial spaced bidirectional distribution zones in the mixing section each comprising a compression area in one channel in phase with a decompression area in the other channel separated by an undercut segment of one of the flights followed immediately by a decompression area in the one channel in phase with a compression area in the other channel separated by the same undercut segment of the flight.

In one form thereof, the invention relates to a method for mixing plastic material that has been at least partially plasticized and contains inhomogeneities comprising feeding the material to the mixing section of a plasticating screw having at least two channels separated by at least two barrier flights each having a plurality of undercut sections spaced apart therealong, rotating the screw to pump the material both forwarding and rearwardly over undercut sections of the barrier flights to cause repetitive subdivision and distribution of any inhomogeneity in both the forward and reverse directions throughout substantially the entire length of the mixing section.

DETAILED DESCRIPTION OF A PREFERRED EMBODIMENT

Figure 1:
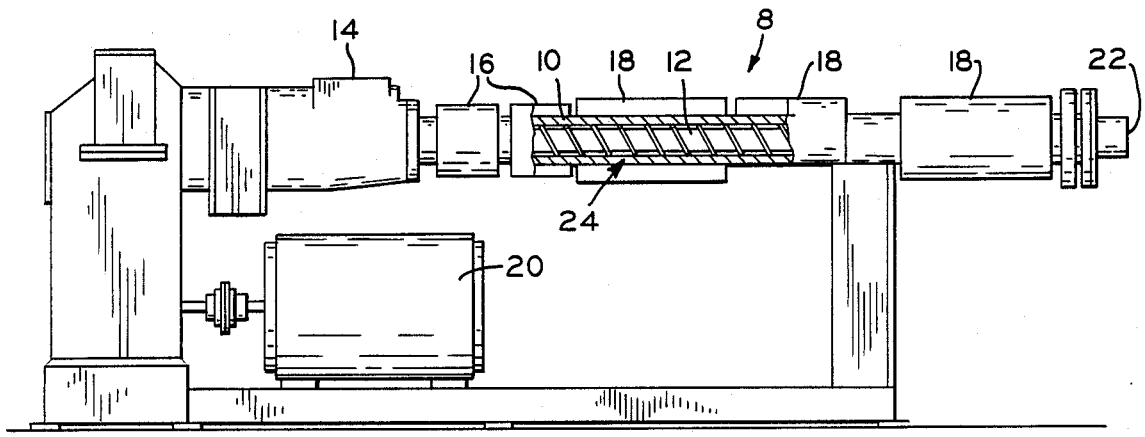
FIG. 1 is an elevational view of an extruder including a mixing screw according to the present invention.

Although the plasticating screw of the present invention can be used in extrusion, injection molding and blow molding applications, as well as perhaps other applications wherein plasticating of thermoplastic or thermosetting materials is accomplished, an extrusion screw will be described in order to illustrate the invention. FIG. 1 illustrates a typical extruder 8 comprising a horizontally extending barrel 10 and a plasticating screw 12 rotatably disposed therein. At its rear end, barrel 10 communicates with a feed opening 14 that receives material from a hopper (not shown) overlying opening 14. The plastic material may be provided in the form of pellets or powders. Heater bands 16 are disposed around the barrel 10 to supply heat to the material being processed. If desired, fluid jackets 18 may also be provided for circulating cooling fluid around barrel 10 to withdraw heat from the material being processed. The material being processed fed through opening 14 is conveyed through barrel 10 by screw 12 as the screw is rotated by motor 20 until the molten plastic material is discharged through the discharge end 22 of extruder 8. Barrel 10 has been broken away in FIG. 1 to illustrate the mixing section 24 that is the subject of the present application.

Figure 2:
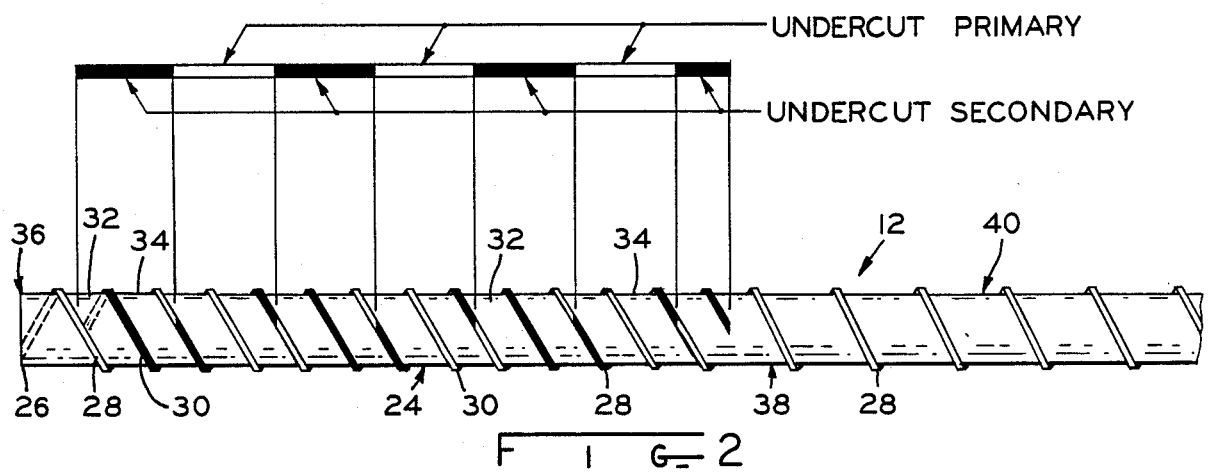
FIG. 2 is an enlarged elevational view of the mixing section of a plasticating screw in accordance with the present invention.

FIG. 2 illustrates a 24:1 version of the two way mixing screw according to the present invention. It should be noted, however, that other configurations are possible, differing in the height, width and depth dimensions of the channel geometry, the pitch, positions and geometries of the flight undercuts, the number of screw channels, and so forth. Screw 12 comprises a root 26 having first and second helically shaped barrier flights 28 and 30 extending radially outwardly from the root 26 to form a pair of flow channels 32 and 34 that extend in parallel, helical fashion along screw 12 from the infeed end 36 of the mixing section 24 to the outfeed end 38. Upstream and downstream of mixing section 24, screw 12 may be of single channel construction wherein barrier flight 28 is of normal height and is in very close clearance with the inner wall of barrel 10. At the infeed end of mixing section 24, the single channel defined by flight 28 is divided into two channels by the start of secondary barrier flight 30, as shown in FIG. 2. Upstream of mixing section 24 may be a transition section or a metering section, and downstream of mixing section 24 the screw may comprise a metering section 40 in accordance with normal extrusion screw design. In an injection molding application, however, a metering section, such as section 40, is typically not required as the need to smooth out pressure pulses is not critical in injection molding.

Figure 3:
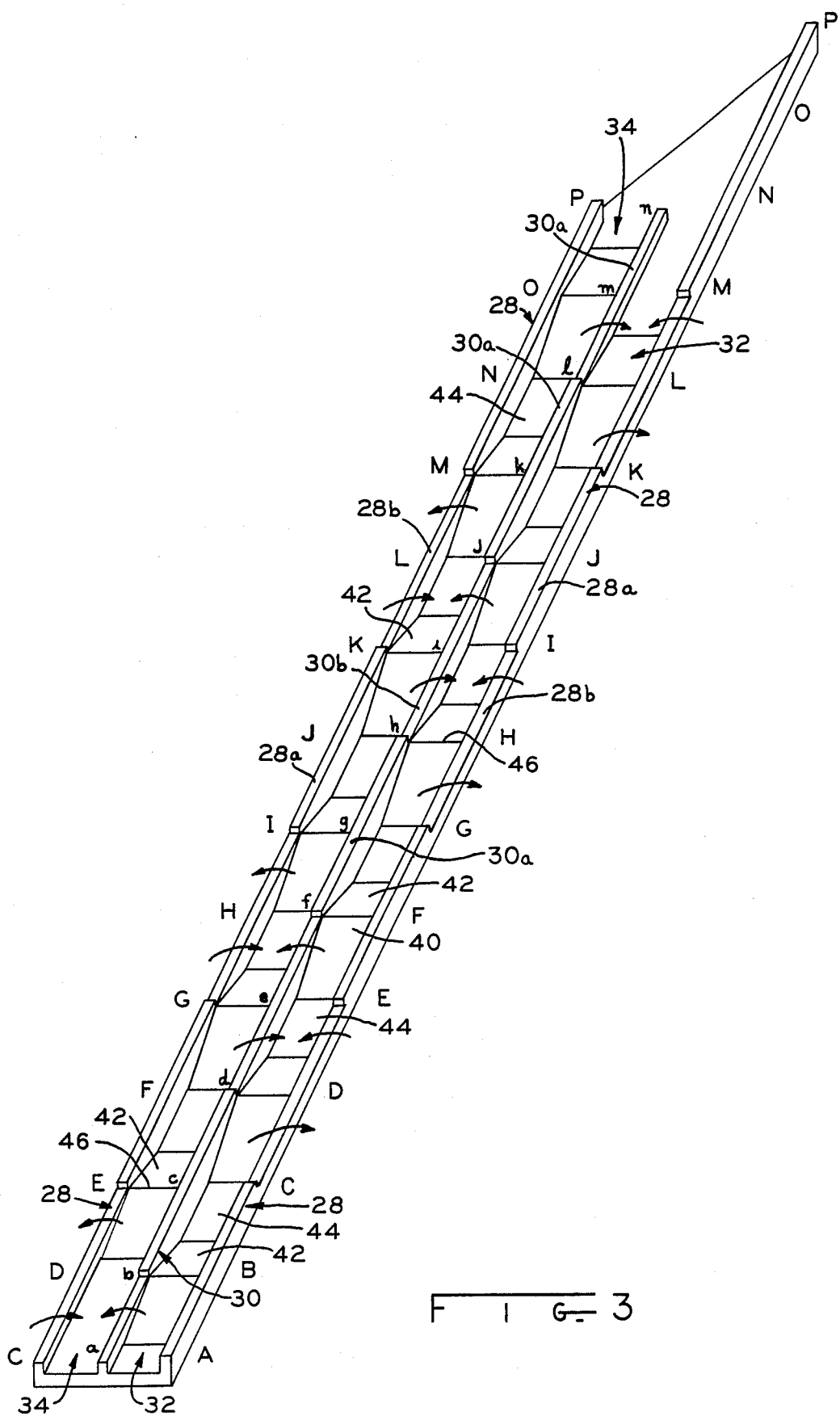
FIG. 3 is a diagrammatic perspective view of the mixing section of the screw of FIG. 2 which has been unwrapped from the screw root and straightened out.

With reference in particular to FIG. 3, in channels 32 and 34 it will be seen that there are regions of decreasing channel depth 40, which are regions of compression, and both regions of increasing channel depth 42 and regions of constant channel depth 44, the latter two regions being areas of decompression. The regions of compression and decompression generate pressure differences between the two channels which induce cross flow. In the particular embodiment illustrated in FIG. 3, the roots of channels 32 and 34 are formed of flat areas 44, linearly increasing compression areas 40 and linearly decreasing decompression areas 42, the latter forming a plurality of peaks 46 along the channels 32 and 34. It will be noted that the peaks formed by slopes 40 and 42 are out of phase with each other such that a peak 46 in channel 34 is located at about the mid-point of the constant depth channel area 44 in channel 32. In the particular embodiment disclosed, the locations of peaks 46 are spaced equidistantly apart along channels 34 and 32.

Variations in channel root geometry are possible to generate the cross flow. For example, such variations may include the absence of constant depth sections 44, different distances between peaks 46, differently shaped regions of compression and decompression, and the like.

Barrier flights 28 and 30 include segments 28a and 30a that are normal height and are in relatively close clearance with the inner wall of barrel 10, and also include segments 28b and 30b, respectively, that are undercut relative to segments 28a and 30a and form larger gaps between them and the barrel wall than do segments 28a and 30a. Normal height barrier flight segments 28a and 30a are separated by undercut segments 28b and 30b, respectively, and in the particular embodiment described herein, it will be noted that the undercut segments 28b for primary barrier flight 28 extend from one peak 46 to the next peak of channel 34, and undercut segments 30b of secondary barrier flight 30 extend from a peak 46 to the next peak 46 in channel 32. However, other geometries are possible, depending on the particular type of bidirectional distribution that is desired.

The two-way mixing screw that is the subject of the present application is intended to provide distributive, i.e. long-range, mixing for screw processing of polymers, such as injection molding, extrusion and blow-molding. The mixing action results from the screw geometry which provides interchange of material between flow regions that differ in both physical location and flow history. It provides distributive mixing by causing mass transfer of material in both the forward and back directions. Forward mixing is mass transfer directed towards the output end of the screw, which will cause the transferred elements to appear earlier in the output. Back mixing or reverse mixing means mass transfer in the back direction toward the feed end of the screw, which will cause such transferred elements to appear later in the output.

Figure 4:
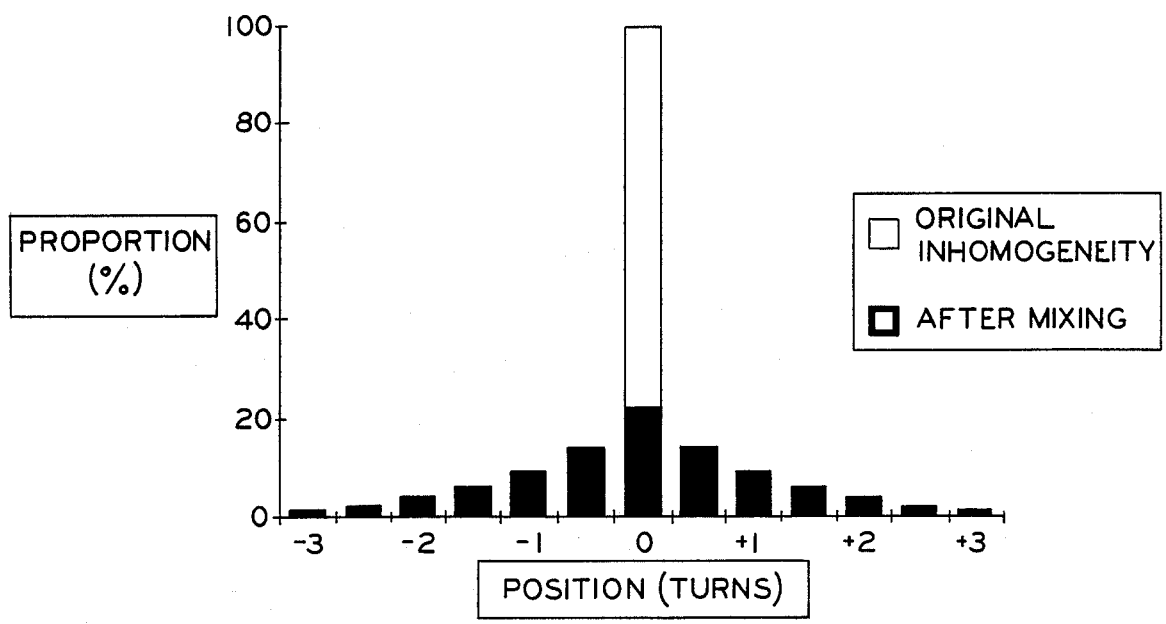
FIG. 4 is a diagrammatic illustration showing the distribution of an inhomogeneity along the mixing section of the screw.

The basis of the operation of the screw is the creation of a distribution of residence times and spatial position of elements of the plastic stream. For example, a local inhomogeneity, which might be a portion of the stream with a different color, physical properties, composition or temperature has portions of the local inhomogeneity withdrawn by the screw from the screw channel and reintroduced at other regions of the melt stream, thereby creating the desired distribution. FIG. 4 shows conceptually a local inhomogeneity prior to arrival at the mixing section of screw 12, at a reference position of 0 turns in the plastic stream. After the stream of plastic has passed through mixing section 24, FIG. 4 illustrates conceptually how the originally local inhomogeneity has been reduced, with portions distributed in the forward direction, i.e., at turns $+1+2+3$, and other portions distributed in the back direction, i.e., at turns $-1-2-3$.

The resultant cross flows from channel to channel are the vector sums of the drag and pressure flows. The magnitude of the pressure flow is given by an equation of the form:

$$Q_p = (h^3 \Delta P)/(12\mu L) \text{ per unit length of undercut}$$

where
  h = undercut height
  $\Delta P$ = pressure difference across undercut (which is a function of screw design, material characteristics, and operating conditions)
  $\mu$ = material viscosity
  L = undercut width Similarly, the magnitude of a drag flow is given by an equation in the form:

$$Q_D = \pi DhN\sin\phi/2 \text{ per unit length of undercut}$$

From the form of these equations, it is clear that screw design can be selected to emphasize pressure or drag flows, each relative to the other, and thus the screw designer can prescribe the resultant cross flows. The action of the mixing screw 12 of the present invention results from pressure driven cross flows. The drag flows introduce additional flow complexities which further enhance mixing action. However, the description that follows is in terms of pressure driven cross flows.

The drawing of screw 12 that is shown in FIG. 3 and was discussed earlier, shows a three dimensional view of the unwrapped mixing section geometry, which is helpful for describing the action of the screw. In this view, the channels 32 and 34 have been unwrapped from the screw and laid flat, and the barrel can be thought of as a flat plate sliding above the geometry at an angle to the down channel direction of the flights 28 and 30. Although flight 28 has been designated at the "primary" flight and flight 30 and the "secondary" flight, once the channel geometries are fully developed, the distinction between primary and secondary flight is less meaningful. The distinction will be retained for convenience, however, using a nomenclature system of lower case letters for locations on the secondary flight 30 and upper case letters for locations on primary flight 28. It should be noted that primary flight 28 is shown on both sides of the geometry, and hence any given location, such as point C, is shown on both sides of the channel.

Primary flight 28 enters mixing section 24 at full height at point A, and the height remains full through point B until point C is reached. From C through D to E, the primary flight 28 is undercut. A repeating sequence of full height regions 28a and undercut regions 28b alternate thereafter. The end of the mixing section 24 of the screw is reached at P. A similar sequence of alternating full height regions 30a and undercut regions 30b is seen along secondary flight 30. From the start of secondary flight 30 at point a until point b, flight 30 is undercut, whereas from b through c to d, the flight is full height. This pattern repeats throughout mixing section 24.

In the fully developed mixing section, for the particular 24:1 geometry shown, the length of each full height section or undercut region of the flights is exactly one turn in length, although other geometries can use different undercut lengths to provide the same function. A particular advantage of the particular version illustrated in the present application is that any section of barrel 10 is wiped by one undercut flight and one full height flight, whereas other geometries may have more or less wiping. The complexity of the channel root geometries on either side of an undercut in the fully developed mixing section gives rise to both forward and back flows at different points along the undercut, and provides the mixing section with its ability to provide for very good distribution of inhomogeneities in both the forward and back directions.

To describe the action of mixing section 24, consider the flow of plastic delivered therealong. Material is conveyed by the rotational action of the upstream, conventional part of the screw and is delivered to the start of mixing section 24 at section CaA, at the lower portion of FIG. 3. The initiation of secondary flight 30 at point a causes division of the flow, with a portion of the flow passing into channel 34 and the remainder passing into channel 32. At different points thereafter along screw 12, material cross flows occur from compression regions 40 to decompression regions 42 and 44 along the various undercut regions of flights 28 and 30. For example, cross flow occurs along d-e from channel 34 from channel 32, and along e-f from channel 32 to channel 34. Arrows have been drawn on the view to indicate the cross flows paths and it is evident that cross flows occur in two different senses, i.e., from channel 32 into channel 34 or from channel 34 into channel 32. The former flow type, which is indicated by left-pointing arrows, is termed a forward flow because it produces mixing in the spatially forward direction, while the latter flow type, which is indicated by right-pointing arrows, is a back flow since it produces mixing in the spatially backward direction. It should be noted that both types of flows occur over the same undercut in the fully developed section.

For purposes of explanation, consider a local inhomogeneity entering channel 32. Many flow paths are possible for withdrawn elements of this inhomogeneity subsequently, so for clarity, only one of these will be followed, this being the path that will provide the most extensive forward mixing. As the original inhomogeneity moves down channel 32 from section CaA to section DbB, an element of the inhomogeneity flows forward across undercut ab into channel 34. Then as the original inhomogeneity moves from section DbB towards section EcC, the element flows across undercut DE forward into channel 32. Now, however, the element arrives at section GeE at the time that the original inhomogeneity arrives at section EcC. Hence, the element has been transferred to a position one turn ahead of the original inhomogeneity, thus commencing to generate the desired distribution. As the original inhomogeneity moves along a channel 32 from section EcC to section FdD, the element flows forward across undercut ef into channel 34, arriving at section HfF as the original inhomogeneity arrives at section FdD. Then, as the original inhomogeneity moves from section FdD to section GeE, the element flows forward across undercut HI into channel 32, arriving at section KiI as the original inhomogeneity reaches section GeE. Now the element has been transferred to a position two turns ahead of the original inhomogeneity.

As the original inhomogeneity moves along channel 32 from section GeE to section HfF, the element flows forward across undercut ij into channel 34, arriving at section LjJ as the original inhomogeneity arrives at section HfF. Then as the original inhomogeneity moves from section HfF to section lgG, the element flows forward across undercut LM into channel 32, arriving at section OmM as the original inhomogeneity reaches section lgG. Now the element has been transferred to a position three turns ahead of the original inhomogeneity, at which relative position it remains since it now leaves the mixing section 24, thus precluding it from further forward transfers.

As previously mentioned, this is only one of a multiplicity of possible forward mixing paths. For example, other elements may miss some of the forward cross flows, or separate from the original inhomogeneity later along the mixing section, in which cases, they will exit section 24 at different spatial positions relative to the original inhomogeneity.

The above relates to forward mixing only. In addition, similar reverse processes lead to back mixing. For example, an element path originating in channel 32 comprising back flows across undercuts CD, de, GH, hi, KL and lm provide the maximum degree of back mixing for the elements shown at the −3 turn position in FIG. 4. Additionally, some elements may miss some backward cross flows, or separate from the original inhomogeneity later along the mixing section and thereby exit the screw at a variety of spatial positions. Furthermore, some other elements may experience both forward and backward cross flows, which again creates a variety of different spatial positions. Similar processes also occur for inhomogeneities diverted into channel 34 by the initiation of secondary flight 30. Thus, the action of both channels 32 and 34 is essentially the same.

The screw designer has the capability of tailoring the final distribution by varying individual geometrical parameters, such as number and degree of compression/decompression sectors, number and geometry of undercuts, and so forth. However, in all cases, the integrity of the concept is maintained by utilizing a screw geometry that provides a combination of forward and back mixing action.

The process of mixing described above can perhaps be better understood by using the simple analogy of a train of boxcars, numbered sequentially from 1 to 24, with material, such as an inhomogeneity, in the middle boxcar 12 which is to be distributed throughout the other boxcars by transferring material from boxcar to boxcar. The first set of operations is simultaneous mass transfers from boxcars 12 to boxcars 13 and 11, where the transferred material is mixed with material already in those boxcars. The second set of operations is simultaneous mass transfer from boxcar 11 to boxcars 10 and 12, from boxcar 12 to boxcars 11 and 13 and from boxcar 13 to boxcars 12 and 14, again with material being mixed in each boxcar after each mass transfer. This pattern of sets of operation is progressively extended in such a way that every set of operation extends the distribution both forward and back by the distance of one boxcar. By using sufficient sets of operations, material initially in boxcar 12 can be found in every other boxcar, once the mixing process has been completed. In other words, the material has been distributed throughout the entire train in both the forward and back directions to achieve the distribution shown diagrammatically in FIG. 4.

Although mixing section 24 is shown as having two channels 32 and 34, the mixing section can be expanded to three or more channels, if desired.

As indicated earlier, the dimensions and geometries of mixing section 24 can be varied. However, one particular example of a 24:1 screw constructed in accordance with the present application comprises a mixing section 24 having a length of approximately 19.50 inches and flights 28 and 30 having a width of 0.31 inches. The height of full height sections 28a and 30a is 0.320 inches, and the height of undercut sections 28b and 30b can be as low as 0.080 inches.

While this invention has been described as having a preferred design, it will be understood that it is capable of further modification. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. A method for mixing plastic material that has been at least partially plasticized and contains inhomogeneities comprising: during normal operation, feeding the material to a mixing section of a plasticating screw having at least two channels separated by at least two barrier flights each having a plurality of undercut sections spaced apart therealong, rotating the screw, and pumping the material both forwardly and rearwardly over undercut sections of the barrier flights to cause repetitive subdivision and distribution of any inhomogeneity in both the forward and back directions throughout substantially the entire length of the mixing section.

2. The method of claim 1 wherein the step of pumping includes compressing the material in one channel to force the material over an undercut section in a forward direction and into an adjacent channel and simultaneously compressing a second portion of material in said adjacent channel to force the second portion over said undercut section in a back direction into said one channel.

3. The method of claim 2 wherein the step of compressing comprises causing relative movement of the material against a region of said one channel having decreasing depth.

4. The method for mixing plastic material that has been at least partially plasticized comprising: during normal operation, feeding the material to a mixing section of a plasticating screw having at least two channels separated by two barrier flights each having a plurality of spaced apart undercut sections spaced therealong, and bidirectionally mixing the material by compressing a portion of the material in one channel and forcing the compressed material over one of the undercut sections of one of the flights in a forward direction into the other channel and simultaneously compressing another portion of the material in said other channel and forcing said another portion of the material over said one undercut section in a back direction into said one channel, said step of bidirectional mixing occurring simultaneously at a plurality of other undercut sections of said barrier flights.

5. The method of claim 4 wherein the steps of forcing the material forwardly and rearwardly over a particular section of a flight occur within one turn of the last mentioned flight.

6. The method of claim 5 wherein the step of compressing comprises causing relative movement of the material in a direction toward an area of decreasing channel depth, which causes the material to flow over an undercut section into an area of the adjacent channel having one of increasing or constant channel depth.

7. The method of claim 4 wherein the step of compressing comprises causing relative movement of the material in a direction toward a segment of decreasing channel depth, which causes the material to flow over an undercut section into an area of the adjacent channel having one of increasing or constant channel depth.

8. A screw for plasticating plastic material, said screw including a mixing section comprising: at least two channels separated by two barrier flights, said flights each having a plurality of spaced-apart undercut sections therealong, first restriction means in one of said channels for compressing material therein and forcing the compressed material across an undercut section of one of said barrier flights in a forward direction into the other channel, and second restriction means in said other channel for simultaneously compressing material therein and forcing the last-mentioned material across one of the undercut sections of one of said barrier flights in a back direction into said one channel, there being a plurality of said first and second restriction means adjacent respective said undercut sections of said barrier flights.

9. The screw of claim 8 wherein each said means for compressing comprises a section of decreasing channel depth.

10. The screw of claim 9 wherein both said means for compressing occur within a single pitch length of the screw.

11. An apparatus for plasticating plastic material comprising a barrel and a screw therein, said screw including: a mixing section comprising at least two channels separated by two barrier flights, said flights each having a plurality of spaced-apart undercut sections therealong, and first restriction means in one of said channels for compressing material therein and forcing the compressed material across one of said undercut sections of one of said barrier flights in a forward direction into the other channel, and second restriction means in said other channel for simultaneously compressing material therein and forcing the last-mentioned material across one of said undercut sections of one of said barrier flights in a back direction into said one channel, there being a plurality of said first and second restriction means adjacent respective said undercut sections of said barrier flights.

12. An apparatus for plasticating plastic material comprising a barrel and rotatable screw in said barrel, said screw having a feed end, a discharge end and a mixing section between the feed and discharge ends, said screw comprising:

a root and at least one pair of helical first and second flights extending radially from said root, said flights dividing said screw into at least two helical channels having bottom surfaces, the bottom surface of each channel comprising axially spaced compression areas of decreasing channel depth spaced along the helical length of the mixing section and decompression areas of one of increasing or constant channel depth spaced along the helical length of the mixing section, said first and second flights each including a plurality of undercut segments separated by segments of greater height, a plurality of bidirectional distribution zones in said mixing section each comprising a said compression area in one channel in phase with a said decompression area in the other channel separated by an undercut segment of one of said flights followed immediately by a said decompression area in said one channel in phase with a said compression area in said other channel separated by said undercut segment of said one flight.

13. The apparatus of claim 12 wherein each of said bidirectional distribution zones is equal in length substantially to one pitch length of the screw.

14. An apparatus for plasticating plastic material comprising a barrel and a rotatable screw in said barrel, said screw having a feed end, a discharge end and a mixing section between the feed and discharge ends, said screw comprising:

a root and at least one pair of helical first and second flights extending radially from said root, said flights dividing said screw into at least two helical channels having bottom surfaces, each channel having a cyclically varying depth and including channel depth minima at spaced locations along the channel, the depth minima at one channel being offset relative to the depth minima in the other channel, said first and second flights each including a plurality of undercut segments separated by segments of greater height, each said undercut segment beginning in the area of a channel depth minimum and terminating in the area of the next channel depth minimum in the same channel, the undercut segments of one flight being axially offset from the undercut segments of the other flight.

15. The screw of claim 8 wherein said undercut sections of said flights are of substantially equal length, and the undercut sections of each flight are spaced apart by sections of the flight having a greater height, said sections of greater height being substantially of equal length.

16. The screw of claim 8 wherein each said means for compressing comprises a section of decreasing channel depth, and said sections of decreasing channel depth in one channel are out of phase with the sections of decreasing channel depth in the other channel.

* * * * *